United States Patent
Kondo et al.

(10) Patent No.: US 9,056,933 B2
(45) Date of Patent: Jun. 16, 2015

(54) PRODUCTION METHOD OF ACRYLIC POLYMER, ACRYLIC POLYMER OBTAINED BY THIS PRODUCTION METHOD AND PLASTISOL COMPOSITION USING THE SAME

(75) Inventors: Toru Kondo, Aichi (JP); Satoshi Mae, Aichi (JP); Masato Yamamoto, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 212 days.

(21) Appl. No.: 13/702,822

(22) PCT Filed: Jun. 9, 2011

(86) PCT No.: PCT/JP2011/063267
§ 371 (c)(1),
(2), (4) Date: Feb. 15, 2013

(87) PCT Pub. No.: WO2011/155566
PCT Pub. Date: Dec. 15, 2011

(65) Prior Publication Data
US 2013/0210979 A1 Aug. 15, 2013

(30) Foreign Application Priority Data

Jun. 10, 2010 (JP) .................. 2010-132759
Feb. 25, 2011 (JP) .................. 2011-040219

(51) Int. Cl.
| | |
|---|---|
| C08K 5/42 | (2006.01) |
| C08F 20/06 | (2006.01) |
| C08F 118/02 | (2006.01) |
| C08F 220/10 | (2006.01) |
| C08F 14/06 | (2006.01) |
| C08F 2/22 | (2006.01) |
| C08F 220/18 | (2006.01) |
| C08F 265/06 | (2006.01) |

(52) U.S. Cl.
CPC .......... *C08F 220/10* (2013.01); *C08F 2/22* (2013.01); *C08F 220/18* (2013.01); *C08F 265/06* (2013.01)

(58) Field of Classification Search
CPC ........ C08F 2/22; C08F 220/10; C08F 220/18
USPC ............ 524/158; 526/319, 317.1, 344, 328.5
See application file for complete search history.

(56) References Cited

FOREIGN PATENT DOCUMENTS

| | | |
|---|---|---|
| EP | 1 498 430 | 1/2005 |
| JP | 07-238105 | 9/1995 |
| JP | 10-087710 | 4/1998 |
| JP | 11-124467 | 5/1999 |
| JP | 2001-089510 | 4/2001 |
| JP | 2005-036189 A | 2/2005 |
| JP | 2005-060712 | 3/2005 |
| JP | 2005-281484 | 10/2005 |
| JP | 2005-343934 | 12/2005 |
| JP | 2010-217557 A | 9/2010 |
| WO | 00/68304 | 11/2000 |
| WO | WO 00/68304 | * 11/2000 |

OTHER PUBLICATIONS

Supplementary European Search Report for corresponding EP 11792523.0 dated Nov. 19, 2013.
International Search Report for PCT/JP2011/063267 dated Sep. 13, 2011.
Office Action issued in counterpart Japanese Patent Application No. 2011-526312 dated Mar. 24, 2015 (partial translation).

* cited by examiner

*Primary Examiner* — William Cheung
(74) *Attorney, Agent, or Firm* — Morgan, Lewis & Bockius LLP

(57) ABSTRACT

A method of producing an acrylic polymer comprising a step of emulsion-polymerizing an acrylic monomer mixture (A) and a step of emulsion-polymerizing an acrylic monomer mixture (B) in the presence of a polymerization initiator and a polymerization inhibitor in amounts satisfying the following formula (1) in the polymer dispersion (D) obtained by the emulsion polymerization thereof, wherein the mass ratio (A)/(B) of the acrylic monomer mixture (A) to the acrylic monomer mixture (B) is 70/30 to 95/5; an acrylic polymer obtained by this production method; and a plastisol composition using the same.

$$0.1 \leq Q/I \leq 30 \quad (1)$$

in the formula (1), Q represents the molar amount of the polymerization inhibitor and I represents the molar amount of the polymerization initiator present in the polymer dispersion (D) before the introduction of the polymerization inhibitor.

5 Claims, No Drawings

PRODUCTION METHOD OF ACRYLIC POLYMER, ACRYLIC POLYMER OBTAINED BY THIS PRODUCTION METHOD AND PLASTISOL COMPOSITION USING THE SAME

This patent application is a U.S. national stage entry under 35 U.S.C. Section 371 of International Patent Application No. PCT/JP2011/063267 filed Jun. 9, 2011, which claims the benefit of foreign priority to Japanese Patent Application No. 2011-040219 filed Feb. 25, 2011 and Japanese Patent Application No. 2010-132759 filed Jun. 10, 2010. The disclosures of all of which are hereby incorporated by reference in their entireties.

TECHNICAL FIELD

The present invention relates to a production method of an acrylic polymer having a multi-layer structure consisting of a plurality of layers having different functions, an acrylic polymer obtained by this production method, and a plastisol composition using the same.

BACKGROUND ART

As a method for imparting a plurality of functions to an acrylic polymer, a method is known of emulsion-polymerizing a plurality of layers having different functions in multiple steps.

For example, as an agent for modifying the impact-resistant of an epoxy resin, there is a report on a core-shell type powdery polymer having an inner layer composed of a (meth) acrylate polymer having a glass transition temperature of −30° C. or lower and an outer layer composed of a (meth) acrylate polymer having a glass transition temperature of 70° C. or higher (patent document 1).

Further, as a vinyl chloride sol alternate material, (meth) acrylic polymer particles are known composed of a core layer giving the flexibility of a coated film and a shell layer suppressing contact of the polymer of the core layer to a plasticizer, thereby giving storage stability. For example, there is a report on a core-shell type acrylic polymer particle composed of a core part and a shell part each having a specific solubility parameter and a specific glass transition temperature (patent document 2). Moreover, there is a report on a method of adding a polymerization inhibitor in the course of a polymerization step to produce an emulsion containing polymers having different particle sizes (patent document 3).

In the method described in patent document 1, however, if the mass ratio of the shell component in the polymer particle is reduced, it becomes difficult to form a particle covered uniformly by the shell layer. It is believed that this difficulty is caused since a polymerization reaction progresses sequentially from a part of contact of the monomer of the shell component to the polymer of the core. When the amount of the core component is 80% by mass or more, it becomes difficult to coat the core component completely by the shell layer, and storage stability thereof tends to be insufficient. If the shell component is used in an amount necessary for uniform coating of the core component, the proportion of the core component decreases, leading to a polymer in which the effect of modifying impact resistance as the original object is low.

Also in the method described in patent document 2, if the mass ratio of the shell part in the polymer particle is reduced, it becomes difficult to form a sufficient coat by the shell component. Thus, if the mass ratio of the core component is increased to obtain a coated film giving satisfactory flexibility, it becomes difficult to completely coat the core, and storage stability thereof tends to be insufficient. Moreover, if the shell component is used in an amount necessary for uniform coating of the core component, the flexibility of the coated film lowers.

The method described in patent document 3 is a method for obtaining a dispersion containing two polymer particles having different physical properties, and is not a method in which a polymer of a core component is coated uniformly by a small amount of a polymer of a shell component and the performances of the core component and the shell component are allowed to manifest.

In the conventional methods, as described above, it is difficult to uniformly coat a polymer of a core component by a small amount of a polymer of a shell component and to manifest the performances of the core component and the shell component in a good balance.

PRIOR ART DOCUMENT

Patent Document

Patent document 1: JP-A No. 05-65391
Patent document 2: WO 2008/090906
Patent document 3: JP-A No. 2008-19451

SUMMARY OF THE INVENTION

Problem to be Solved by the Invention

The present invention has an object of providing a method of producing an acrylic polymer in which even if the mass ratio of a shell component is low, a core component can be covered sufficiently and the functions of the polymers provided in multiple steps can be manifested, and which is excellent in storage stability and capable of obtaining a coated film excellent in flexibility.

Means for Solving the Problem

The present invention relates to a method of producing an acrylic polymer comprising
a step of emulsion-polymerizing an acrylic monomer mixture (A) and
a step of emulsion-polymerizing an acrylic monomer mixture (B) in the presence of a polymerization initiator and a polymerization inhibitor in amounts satisfying the following formula (1), in the polymer dispersion (D) obtained by the emulsion polymerization thereof,
wherein the mass ratio (A)/(B) of the acrylic monomer mixture (A) to the acrylic monomer mixture (B) is 70/30 to 95/5.

$$0.1 \leq Q/I \leq 30 \quad (1)$$

in the formula (1), Q represents the molar amount of the polymerization inhibitor and I represents the molar amount of the polymerization initiator existing in the polymer dispersion (D) before the introduction of the polymerization inhibitor.

Further, the present invention relates to an acrylic polymer obtained by the above-described production method, and to a plastisol composition containing this acrylic polymer and a plasticizer.

Effect of the Invention

In the production method of an acrylic polymer of the present invention, since a polymerization inhibitor is present in a specific ratio to a polymerization initiator, the progress of the polymerization reaction of a monomer of an outer layer added to the reaction system is suppressed, and after uniform mixing of the monomer of the outer layer and a polymer of an inner layer, the polymerization reaction of the monomer of the outer layer progresses. By this mechanism, the production method of the present invention is capable of obtaining a particle in which the polymer of the inner layer is covered uniformly by a small amount of the polymer of the outer layer, and is capable of producing a multi-layer polymer which can maximally manifest the effects of the inner layer and the outer layer.

A plastisol composition using the acrylic polymer obtained by the production method of the present invention is excellent in storage stability and also the resulting coated film has excellent flexibility.

MODES FOR CARRYING OUT THE INVENTION

The production method of an acrylic polymer of the present invention comprises a step of emulsion-polymerizing an acrylic monomer mixture (A) and a step of emulsion-polymerizing an acrylic monomer mixture (B) in the presence of a polymerization initiator and a polymerization inhibitor in amounts satisfying the following formula (1) in the polymer dispersion (D) obtained by the emulsion polymerization thereof:

$$0.15 \leq Q/I \leq 30 \quad (1)$$

in the formula (1), Q represents the molar amount of the polymerization inhibitor and I represents the molar amount of the polymerization initiator existing in the polymer dispersion (D) before the introduction of the polymerization inhibitor.

[Emulsion Polymerization of Acrylic Monomer Mixture (A)]

The acrylic monomer mixture (A) is polymerized by emulsion polymerization. The emulsion polymerization may be carried out in one reaction or in multiple steps including a plurality of reactions. In the emulsion polymerization and temperature control can be appropriately conducted. The completion of the emulsion polymerization reaction can be judged from the residual amount of monomers. The polymer dispersion (D) containing the polymer (A) obtained by the emulsion polymerization of the acrylic monomer mixture (A) is used for polymerization of the acrylic monomer mixture (B).

The emulsion polymerization of the acrylic monomer mixture (A) may be carried out in the presence of a polymer particle (S) acting as a seed particle. The polymer particle (S) can be produced by known methods such as soap free polymerization of an acrylic monomer and fine suspension polymerization thereof.

[Acrylic Monomer Mixture (A)]

The acrylic monomer mixture (A) is not particularly restricted providing that it contains an acrylic monomer. Examples of the acrylic monomer include (meth)acrylates such as methyl (meth)acrylate, butyl (meth)acrylate, 2-hydroxyethyl (meth)acrylate, 2-hydroxypropyl (meth)acrylate, 2-ethylhexyl (meth)acrylate, octyl (meth)acrylate, 2-acetoacetoxyethyl (meth)acrylate, dimethylaminoethyl (meth)acrylate and diethylaminoethyl (meth)acrylate, unsaturated carboxylates such as vinyl acetate, unsaturated carboxylic acids such as acrylic acid and methacrylic; acrylonitrile and acrylamide. These can be used singly or two or more of them may be used in combination. Further, aromatic vinyl compounds such as styrene, α-methylstyrene, vinyltoluene and divinylbenzene, substituted ethylene compounds such as vinyl chloride and vinylidene chloride can be used as the monomer, together with the above-described compounds.

If the resulting acrylic polymer is used in a plastisol, it is preferable that the polymer (A) obtained from the acrylic monomer mixture (A) has compatibility with a plasticizer, from the standpoint of improvement in the flexibility of the resulting coated film. If, for example, diisononyl phthalate is used as a plasticizer for a plastisol, it is preferable to use the above-exemplified acrylic monomer. Of them, particularly methyl methacrylate and butyl methacrylate are preferably contained. The content of them is adjusted so as to obtain a polymer (A) having compatibility with a plasticizer. It is preferable that the total mass of methyl methacrylate and butyl methacrylate in the acrylic monomer mixture (A) is 50% by mass or more. It is more preferable that the mass ratio of methyl methacrylate to butyl methacrylate is 20/80 to 75/25.

Furthermore, it is further preferable that t-butyl methacrylate is contained in an amount of 10% by mass or more in butyl methacrylate, from the standpoint of improvement in chipping strength and of storage stability.

It is preferable that the solubility parameter (SA) of the polymer (A) obtained by polymerizing the acrylic monomer mixture (A) is 20.14 $(J/cm^3)^{1/2}$ or less, from the standpoint of compatibility with a plasticizer.

Here, the solubility parameter is calculated by substituting the Sp value (Sp(Ui)) of a monomer unit constituting the polymer into the following formula (2). Sp(Ui) can be measured by the Fedors method described in Polymer Engineering and Science, Vol. 14, 147 (1974). The Sp values (Sp(Ui)) of monomer units used are shown in Table 1.

TABLE 1

| | Sp(ui) $(J/cm^3)^{1/2}$ |
|---|---|
| MMA | 20.32 |
| n-BMA | 19.32 |
| i-BMA | 18.95 |
| t-BMA | 18.56 |
| 2-HEMA | 27.55 |

[Numerical formula 1]

$$\text{Sp Value of Polymer} = \sum_{i=1}^{n}(Mi \times Sp(ui)) \quad (2)$$

in the formula (2), Mi represents the molar fraction of an i component as a monomer unit and ΣMi=1.

[Emulsifier]

For the emulsion polymerization of the acrylic monomer mixture (A), anionic surfactants and nonionic surfactants can be used as an emulsifier. Examples of the anionic surfactant include salts of alkylbenzenesulfonic acids, salts of alkylsulfonic acids, salts of alkylsulfates, metal salts of fatty acids, salts of polyoxyalkyl ether sulfates, salts of polyoxyethylenecarboxylate sulfates, salts of polyoxyethylene alkyl phenyl ether sulfates and salts of dialkyl succinate sulfonic acids. These may be used singly or two or more of them may be used in combination.

Examples of the nonionic surfactant include compounds having a polyoxyethylene chain in its molecule and having a surface active performance such as polyoxyethylene alkylphenyl ethers, polyoxyethylene alkyl ethers, polyoxyethylene fatty acid esters, polyoxyethylene sorbitan fatty acid esters, polyoxyethylene alkyl ether glycerin borates, polyoxyethylene alkyl ether phosphates and polyoxyethylene, compounds obtained by substituting a polyoxyethylene chain in these compounds by a copolymer of oxyethylene and oxypropylene; sorbitan fatty acid esters, fatty acid glycerin esters, glycerin fatty acid esters and pentaerythritol fatty acid esters. These may be used singly or two or more of them may be used in combination. The use amount of these surfactants is preferably in the range of 0.1 to 5 parts by mass with respect to 100 parts by mass of the acrylic monomer mixture (A).

[Polymerization Initiator]

The polymerization initiator used for emulsion polymerization of an acrylic monomer may include hydrogen peroxide, water-soluble inorganic peroxides, or a combination of water-soluble reducing agents and organic peroxides. The water-soluble inorganic peroxide may include potassium persulfate and ammonium persulfate. These may be used singly or two or more of them may be used in combination. The use amount thereof is preferably in the range of 0.01 to 0.5 parts by mass with respect to 100 parts by mass of all monomers subjected to polymerization. The water-soluble reducing agent may include ethylenediaminetetraacetic acid and sodium and potassium salts thereof, complex compounds of them with a metal such as iron, copper and chromium, sulfinic acid and sodium and potassium salts thereof, L-ascorbic acid and sodium, potassium and calcium salts thereof, ferrous pyrophosphate, ferrous sulfate, ammonium ferrous sulfate, sodium sulfite, acidic sodium sulfite, sodium formaldehyde sulfoxylate and reducing sugars. These may be used singly or two or more of them may be used in combination. The organic peroxide may specifically include hydroperoxides such as cumene hydroperoxide, p-cymene hydroperoxide, t-butylisopropylbenzene hydroperoxide, diisopropylbenzene hydroperoxide, p-menthane hydroperoxide, decalin hydroperoxide, t-amyl hydroperoxide, t-butyl hydroperoxide and isopropyl hydroperoxide. These may be used singly or two or more of them may be used in combination.

[Emulsion Polymerization of Acrylic Monomer Mixture (B)]

An acrylic monomer mixture (B) is emulsion-polymerized in the presence of a polymerization initiator and a polymerization inhibitor in amounts satisfying the following formula (1) in the polymer dispersion (D) obtained by emulsion-polymerizing the above-described acrylic monomer mixture (A):

$$0.15 \leq Q/I \leq 30 \quad (1)$$

in the formula (1), Q represents the molar amount of the polymerization inhibitor and I represents the molar amount of the polymerization initiator existing in the polymer dispersion (D) before the introduction of the polymerization inhibitor.

The emulsion polymerization of the acrylic monomer mixture (B) is conducted with addition of a polymerization inhibitor to the polymer dispersion (D) after completion of the emulsion polymerization reaction of the acrylic monomer mixture (A). The polymerization inhibitor temporarily inhibits the polymerization reaction of the acrylic monomer mixture (B), and owing to the presence of the polymerization inhibitor, generation of a radical by a polymerization initiator and progress of a polymerization reaction by the radical are suppressed in the acrylic monomer mixture (B) added to the polymer dispersion (D), and even if the mixture (B) comes into contact with the polymer (A), progress of the polymerization reaction does not start, and in the meantime, the mixture (B) is mixed sufficiently with the polymer (A) in the polymer dispersion (D) and ranges over the surface of the polymer (A). Thereafter, the polymerization reaction starts, thereby forming a layer of the polymer (B) of the acrylic monomer mixture (B) over the whole periphery of the polymer (A).

Regarding the amount of the polymerization inhibitor in the polymer dispersion (D), the Q/I ratio of the molar amount (O) thereof to the molar amount (I) of the polymerization initiator is 0.1 or more and 30 or less. When Q/I is 0.1 or more, generation of a radical by the polymerization initiator can be suppressed for a certain time, and a layer of the polymer (B) is formed over the whole periphery of the polymer (A), thus, storage stability is excellent in the case of use as a plastisol. When Q/I is 30 or less, polymerization of the monomer mixture (B) does not stop and a layer of the polymer (B) is formed, leading to excellent storage stability. Q/I is preferably 0.1 or more and 27.5 or less. Q/I is more preferably 0.5 or more and 25 or less.

The content of the polymerization initiator present in the polymer dispersion (D) as a criterion for the addition amount of the polymerization inhibitor is the residual amount of the polymerization initiator used for polymerization of the acrylic monomer mixture (A) in the polymer dispersion, and can be calculated according to the following formulae (3) and (4).

$$kd(1/s) = A \exp(-\Delta E/RT) \quad (3)$$

kd: thermal decomposition rate constant of polymerization initiator
A: frequency factor (1/s) of polymerization initiator
$\Delta E$: activation energy (J/mol) of polymerization initiator
R: gas constant (8.314 J/mol·K)
T: absolute temperature (K) of polymerization reaction $$\text{residual ratio}(\%) \text{ of polymerization initiator} = \exp(-kdt) \times 100 \quad (4)$$

t: polymerization reaction time (s)

That is, the thermal decomposition rate constant kd of the polymerization initiator to be used at the polymerization temperature T of the acrylic monomer mixture (A) is calculated according to the formula (3). Further, the residual ratio of the polymerization initiator after reaction for t (s) under the polymerization temperature T is calculated according to the formula (4) using the resultant kd, and the residual amount can be calculated based on the use amount of the polymerization initiator.

The frequency factor A and the activation energy $\Delta E$ are specific constants of the polymerization initiator, and can be calculated based on data described in Matsumoto, Ookubo, KOBUNSHI RONBUNSHU Vol. 32, No. 4, pp. 229-234 (1975). Specifically, $$A = 2.87 \times 10^{16} (1/s)$$

$$\Delta E = 137937 (J/mol),$$

in the case of potassium persulfate.

The polymerization inhibitor may include specifically phenol compounds such as hydroquinone, p-methoxyphenol and p-t-butylcatechol, hydroxylamine compounds such as N,N-diethylhydroxylamine and ammonium N-nitrosophenylhydroxylamine (Cupferron), organosulfur compounds such as dithiobenzoyl disulfide and tetraethylthiuram disulfide, etc. These may be used singly or two or more of them may be used in combination. Of them, preferable are polymerization inhibitors having a solubility in water at 25° C. of 5 g/100 ml or less. Such polymerization inhibitors may include p-methoxyphenol, p-t-butylcatechol and diphenylamine.

The addition method of the polymerization inhibitor may be a method in which a polymerization inhibitor is added to the polymer dispersion (D) after completion of the emulsion polymerization reaction of the acrylic monomer mixture (A) prior to addition of the acrylic monomer mixture (B) or a method in which a polymerization inhibitor is added previously to the acrylic monomer mixture (B) and this is added to the polymer dispersion (D).

As the acrylic monomer used in the acrylic monomer mixture (B), use can be made of the same monomers as the acrylic monomer used in the acrylic monomer mixture (A). When the resulting acrylic polymer is used in a plastisol, it is preferable that the polymer (B) obtained from the acrylic monomer mixture (B) shows poor compatibility with a plasticizer, from the standpoint of imparting storage stability to an acrylic sol. When, for example, diisononyl phthalate is used as a plasticizer, the acrylic monomer used in the acrylic monomer mixture (B) may include methyl (meth)acrylate, butyl (meth)acrylate, (meth)acrylate and 2-hydroxylethyl methacrylate. The content of them is adjusted so as to obtain the polymer (B) showing poor compatibility with a plasticizer. It is preferable that methyl methacrylate is contained in the amount of 75% by mass or more in the acrylic monomer mixture (B).

When the resulting acrylic polymer is used in a plastisol, it is preferable that the solubility parameter (SB) obtained by the above-described method of the polymer (B) obtained by polymerizing the acrylic monomer mixture (B) is larger than the solubility parameter (SA) of the polymer (A) obtained by polymerizing the acrylic monomer mixture (A), from the standpoint of storage stability.

It is preferable that the solubility parameter (SB) is higher than the solubility parameter of a plasticizer, from the standpoint of storage stability, and it is preferably 20.22 $(J/cm^3)^{1/2}$ or more.

The use amount of the acrylic monomer mixture (B) is an amount adjusted so that the mass ratio (A)/(B) of the acrylic monomer mixture (A) to the acrylic monomer mixture (B) is 70/30 to 95/5. More preferably, the mass ratio (A)/(B) is 80/20 to 95/5. When the use proportion of the acrylic monomer mixture (B) is 5% by mass or more, the polymer (A) can be sufficiently covered, and storage stability is excellent in the case of use in an acrylic sol. When the use proportion of the acrylic monomer mixture (B) is 30% by mass or less, excellent flexibility is obtained in the resulting molded body such as a coated film. It is preferable that the use proportion of the acrylic monomer mixture (B) is 15% by mass or less, from the standpoint of the tensile strength and the chipping resistance of the molded body such as a coated film.

The emulsion polymerization of the acrylic monomer mixture (B) can be carried out by the same method as for the emulsion polymerization of the acrylic monomer mixture (A). The acrylic monomer mixture (B) may be added to the polymer dispersion (D) at once or may be divided and added to the polymer dispersion (D) in several times.

[Acrylic Polymer]

The weight-average molecular weight of the acrylic polymer obtained by the production method of the present invention is preferably 10000 to 4000000, more preferably 50000 to 3000000, further preferably 300000 to 2000000. When the weight-average molecular weight is 4000000 or less, the acrylic polymer is easily plasticized by a plasticizer and one having excellent processability as a plastisol is obtained, and when 10000 or more, lowering of storage stability as a plastisol can be suppressed.

The volume average particle size of the resulting acrylic polymer in the dispersion after the emulsion polymerization reaction is preferably 0.05 to 2 μm. When the acrylic polymer is used in a plastisol, storage stability is more excellent when the volume average particle size is larger, that is, when the surface area is smaller. The volume average particle size of the acrylic polymer is more preferably 0.2 to 2 μm.

Here, the value measured by using laser diffraction/scattering particle size distribution analyzer LA-920 (manufactured by HORIBA, Ltd.) can be adopted as the volume average particle size.

The acrylic polymer generated by the above-described acrylic polymer production method can be obtained as a powder from the polymer dispersion by a spray drying method or by performing acid coagulation or salt coagulation before drying, after the emulsion polymerization of the acrylic monomer mixture (B). Preferable is a spray drying method giving a powder having a secondary particle structure formed by agglomeration of a lot of polymers or a more highly agglomerated particle structure, in which primary particles are not bonded strongly and agglomerated loosely, and capable of being returned into primary particles easily under weak shearing force.

It is preferable that thus obtainable powder of the acrylic polymer has a volume average particle size of 5 to 200 μm, when used in a plastisol. When the volume average particle size of the acrylic polymer powder is 5 μm or more, handling of the polymer in producing a plastisol composition is easy, and when 200 μm or less, the polymer in the plastisol composition can be dispersed uniformly, and the coated film obtained by using this shows little contaminated grains generated by poor dispersion of the polymer and a molded body having excellent appearance can be obtained.

[Plastisol Composition]

The plastisol composition of the present invention contains an acrylic polymer obtained by the above-described acrylic polymer production method and a plasticizer, and is obtained by mixing them, and, if necessary, other fillers. By inclusion of the above-described acrylic polymer, storage stability becomes excellent and sol behavior can be maintained over a long period of time.

Examples of the plasticizer include phthalate plasticizers such as dimethyl phthalate, diethyl phthalate, dibutyl phthalate, diheptyl phthalate, di-2-ethylhexyl phthalate, di-n-octyl phthalate, diisononyl phthalate, diisodecyl phthalate and butylbenzyl phthalate, adipate plasticizers such as dimethyl adipate, dibutyl adipate, diisobutyl adipate, dihexyl adipate, di-2-ethylhexyl adipate, diisononyl adipate and dibutyl diglycol adipate, phosphate plasticizers such as trimethyl phosphate, triethyl phosphate, tributyl phosphate, tri-2-ethylhexyl phosphate, tributoxyethyl phosphate, triphenyl phosphate, tricresyl phosphate, trixylenyl phosphate and cresylphenyl phosphate, trimellitate plasticizers such as tri-2-ethylhexyl trimellitate, sebacate plasticizers such as dimethyl sebacate, dibutyl sebacate and di-2-ethylhexyl sebacate, aliphatic polyester plasticizers such as poly-1,3-butanediol adipate, benzoic acid plasticizers such as diethylene glycol dibenzoate and dibutylene glycol dibenzoate, epoxidized ester plasticizers such as epoxidized soybean oil, phenyl alkyl sulfonate plasticizers such as phenyl alkyl sulfonate, alicyclic dibasic acid ester plasticizers, polyether plasticizers such as polypropylene glycol and polybutylene glycol, citric acid plasticizers such as acetyl tributyl citrate; etc. These can be used singly or two or more of them can be used in combination. Among them, one or two or more of dioctyl phthalate, diisononyl phthalate, diisodecyl phthalate, Mesamoll and acetyl tributyl citrate are preferably used as main components.

The content of the acrylic polymer particle in the plastisol composition is preferably 5% by mass or more and 70% by mass or less. When the content is 5% by mass or more, the resulting coat and molded body are excellent in strength, and when 70% by mass or less, the viscosity of the plastisol composition lowers, leading to excellent processability thereof.

The plastisol composition may contain, if necessary, a filler, an adhesive, in a range not disturbing the functions of the above-described components. Examples of the filler include calcium carbonate, aluminum hydroxide, colloidal silica, talc, glass powder and aluminum oxide, and the content thereof can be appropriately selected depending on the object.

The adhesive can be appropriately selected depending on a base material When the base materials is an electrodeposited plate or a steel plate, adhesives such as epoxy resins, block isocyanate resins and polyamines can be used. These can be used singly or two or more of them can be used in combination. Further, as a hardening agent for these adhesives, for example, acid anhydrides and imidazole compounds can be used for epoxy resin adhesives and dihydrazide compounds can be used for block isocyanate resin adhesives.

Additionally, the plastisol composition can contain pigments such as titanium oxide and carbon black, diluents such as mineral turpentine and mineral spirit, further, defoaming agents, fungicides and leveling agents, in a range not disturbing the above-described components.

As an apparatus for producing the plastisol composition, known apparatuses can be used and examples thereof may include a pony mixer, a change-can mixer, a Hobert mixer, a planetary mixer, a butterfly mixer, a grinding machine (raikai mixer) and a kneader.

The plastisol composition of the present invention can be used as a coating material and a molding material, and is particularly useful as a coating material. The molding can be conducted by any methods, and the method of forming a coat may include a method in which a coated film is formed by a dip coating method, a spray coating method or the like and this is baked.

The plastisol composition can be applied to any molded articles, and examples thereof include automobile underbody coatings, automobile body sealers, automobile mastic adhesives, automobile damping coats, tile carpet packing materials, cushion floorings, wallpapers and steel plate paints.

EXAMPLES

The present invention will be described in detail by examples below. Evaluation methods and evaluation criteria in examples are as described below. In the following descriptions, "parts" means "parts by mass".

Example 1

Preparation of Acrylic Polymer

Into a 2-L four-necked flask equipped with a thermometer, a nitrogen gas introduction tube, a stirrer, a dropping funnel and a cooling tube was charged 544 g of ion exchanged water, and a nitrogen gas was ventilated for 30 minutes to substitute dissolved oxygen in ion exchanged water. After stopping of ventilation of a nitrogen gas, the mixture was heated up to 80° C. while stirring at 200 rpm. When the inner temperature reached 80° C., a monomer mixture (S) of 26.1 g of methyl methacrylate and 19.9 g of n-butyl methacrylate was introduced at once. Subsequently, 0.40 g of potassium persulfate and 16 g of ion exchanged water were introduced. After 45 minutes, 0.32 g of sodium dialkylsulfosuccinate (trade name: PELEX OT-P, manufactured by Kao Corporation) and 16.0 g of ion exchanged water were introduced. Further after 15 minutes, a monomer mixture (A) of 336 g of methyl methacrylate, 318 g of t-butyl methacrylate, 17.5 g of 2-hydroxyethyl methacrylate, 5.8 g of PELEX OT-P and 235 g of ion exchanged water was dropped over 4 hours and 30 minutes to complete polymerization, obtaining a dispersion of the polymer (A).

Next, after keeping at 80° C. for 60 minutes, 24 mg of p-methoxyphenol and 4 g of ion exchanged water were introduced as a polymerization inhibitor into the dispersion of the polymer (A). The addition amount of the polymerization inhibitor was calculated according to the above-described formulae (3) and (4). The amount of the polymerization inhibitor added with respect to the polymerization initiator contained in the polymer dispersion is 1.8 in terms of molar ratio. The reaction ratio of the monomer mixture (A) directly before addition of the polymerization inhibitor was 97%.

Five minutes after introduction of the polymerization inhibitor, a monomer mixture (B) of 77.6 g of methyl methacrylate, 2.4 g of 2-hydroxyethyl methacrylate, 0.8 g of PELEX OT-P and 28 g of ion exchanged water was dropped over 30 minutes. Stirring at 80° C. was continued for 2 hours and 30 minutes, to obtain a dispersion of the polymer (P-1). The polymerization was carried out under an environment of ventilation of a nitrogen gas at a rate of 25 ml per minute. The resultant dispersion of the polymer (P-1) was spray-dried under conditions of inlet temperature/outlet temperature=150/65° C. and a disk revolution of 20000 rpm using a spray drier L-8 type (manufactured by OHKAWARA KAKOHKI Co., Ltd.).

The primary particle size in the polymer dispersion before spry drying of the polymer (P-1) and the volume average particle size of the secondary particle after spray drying thereof were measured by using a laser diffraction particle size distribution analyzer (trade name: HORIBA LA-920, manufactured by HORIBA, Ltd.).

[Amount of Polymerization Inhibitor]

After introduction of the polymerization initiator, the polymerization temperature was constant at 80° C., and the polymerization inhibitor was introduced 390 minutes after introduction of the polymerization initiator.

The thermal decomposition rate constant kd of potassium persulfate at 80° C. was $1.11 \times 10^{-4}$, according to the above-described formula (3). Polymerization was initiated under an environment of 80° C. using 0.4 g of potassium persulfate (molecular weight: 270.3), and the residual ratio of potassium persulfate after 390 minutes is determined to be 7.4% according to the above-described formula (4). That is, the residual molar number of potassium persulfate in introducing the polymerization inhibitor is $2.19 \times 10^{-4}$ mol.

Since the molar number of 24 mg of p-methoxyphenol (molecular weight: 124.1) as the polymerization inhibitor is $1.93 \times 10^{-4}$ mol, the molar ratio of the polymerization initiator to the polymerization inhibitor in introducing the polymerization inhibitor is 1.8.

[Preparation of Plastisol Composition]

One hundred (100) parts of calcium carbonate (trade name: NS#200, manufactured by Nitto Funka Kogyo K.K.), 150 parts of surface-treated calcium carbonate (trade name: HAKUENKA CCR, manufactured by SHIRAISHI KOGYO KAISHA, Ltd.), and as a plasticizer, 180 parts of diisononyl phthalate (manufactured by J-PLUS Co., Ltd.), 20 parts of a phenyl alkyl sulfonate plasticizer (trade name: Mesamoll, manufactured by Bayer), 40 parts of a block urethane resin (trade name: Takenate B-7040, manufactured by Mitsui Chemical Polyurethanes), 1.76 parts of adipic dihydrazide (trade name: Adipic Dihydrazide, manufactured by Otsuka Chemical Co., Ltd.), and 3 parts of calcium oxide were weighed and mixed under atmospheric pressure (0.1 MPa) for 5 seconds by a vacuum mixer ARV-200 (manufactured by THINKY Corporation), then, the pressure was reduced to 2.7 kPa, and the mixture was mixed for 175 seconds to obtain a kneaded material composed of calcium carbonate and plasticizers. Subsequently, 100 parts of the polymer (P-1) was added and mixed under atmospheric pressure (01. MPa) for 5 seconds by a vacuum mixer, then, the pressure was reduced to 2.7 kPa and the mixture was mixed for 115 seconds to obtain a plastisol composition. The resultant plastisol composition was evaluated for chipping resistance, adhesive strength, tensile strength, tensile elongation and storage stability as described below. The results are shown in Table 2.

[Adhesive Strength]

Two cation electro-deposited plates (manufactured by Japan Route Service K.K.) of 70×25×0.8 mm were laminated over a length of 45 mm, and the plastisol composition was coated on an area of 25×25×3 mm at the center part between them, and heated at 130° C. for 30 minutes to obtain a test piece. The two cation electro-deposited plates of the resultant test piece were pulled in longitudinal opposite directions under an environment of 23° C., and the shear adhesion strength was measured. In the measurement, a tensile testing machine (trade name: AG-IS 5KN, manufactured by Shimadzu Corporation) was used and the test rate was 50 mm/min.

[Tensile Strength, Tensile Elongation]

A plastisol composition was coated with a thickness of 2 mm on a Teflon(registered trademark)-coated iron plate, and heated in an oven of 130° C. for 30 minutes to obtain a coated film. This coated film was punched into the shape of dumbbell No. 2, obtaining a test piece. This was subjected to a tensile test under an environment of 23° C., and the strength of the coated film was measured. In the measurement, a tensile testing machine (trade name: AG-IS 5KN, manufactured by Shimadzu Corporation) was used and the test rate was 200 mm/min.

[Chipping Resistant]

A plastisol composition was coasted on a cation electro-deposited plate (manufactured by Japan Route Service K.K.) of 150×70×0.8 mm, and heated at 130° C. for 30 minutes, to make a coating film having a thickness of 1 mm. Cuts of 2 mm (longitudinal)×4 mm (lateral) were made to prepare a test piece which was then placed at an angle of 60° from the horizontal direction. A test of allowing 3 kg of bras nuts (M4 size) to collide the test piece from a height of 2 m through a vinyl chloride pipe having a diameter of 20 mm was repeated, and the total mass of the nuts dropped until breakage of the test piece to expose the base material was measured.

[Storage Stability]

One hundred (100) parts of the polymer (P-1), and as a plasticizer, 100 parts of diisononyl phthalate (manufactured by J-PLUS Co., Ltd.) were mixed under atmospheric pressure (0.1 MPa) for 5 seconds in a vacuum mixer, then, the pressure was reduced to 2.7 kPa and the mixture was mixed for 115 seconds, to obtain a plastisol composition for storage stability evaluation. The resultant plastisol composition was thermally kept for 2 hours in a constant-temperature bath of 25° C., then, the viscosity ($\alpha$) (unit: Pa·s) after 1 minute was measured using a BH type viscometer (manufactured by Tokyo Keiki Inc.) No. 7 rotor at a revolution of 20 rpm, as the initial viscosity. The plastisol composition for storage stability evaluation after the measurement was stored under an atmosphere of 40° C., and the viscosity ($\beta$) was measured after 5 days and after 10 days by the same method as for the initial viscosity, and the viscosity increasing rate (%) was calculated from this value and the initial viscosity ($\alpha$) according to the following formula (5).

$$\text{Viscosity increasing rate}(\%) = [(\beta-\alpha)/\alpha] \times 100 \tag{5}$$

Examples 2 to 11, Comparative Examples 1 to 3

Polymers P-2 to P-11 and C-1 to C-4 were prepared and plastisol compositions were prepared and evaluated in the same manner as in Example 1, excepting that the kind and the amount of the monomer mixture (A), the monomer mixture (B) and the polymerization inhibitor, and the introduction time and the introduction method of the polymerization inhibitor were changed as shown in Table 2. The results are shown in Table 2.

TABLE 2

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Granular Multi-stage Polymer | | P-1 | P-2 | P-3 | P-4 | P-5 | P-6 | P-7 | P-8 |
| Monomer Mixture A | MMA(g) | 336 | 336 | 336 | 336 | 336 | 336 | 336 | 336 |
| | t-BMA(g) | 318 | 318 | 318 | 318 | 318 | 318 | 318 | 318 |
| | i-BMA(g) | 0 | 0 | 0 | 0 | 0 | 0 | 0 | 0 |
| | 2-HEMA(g) | 17.5 | 17.5 | 17.5 | 17.5 | 17.5 | 17.5 | 17.5 | 17.5 |
| | SP value (J/cm3)1/2 | 19.80 | 19.80 | 19.80 | 19.80 | 19.80 | 19.80 | 19.80 | 19.80 |
| Polymerization Inhibitor | Kind of Polymerization Inhibitor | MEHQ | MEHQ | MEHQ | MEHQ | MEHQ | non | non | TBC |
| | Amount of Polymerization Inhibitor (g) | 0.024 | 0.36 | 0.006 | 0.012 | 0.24 | 0 | 0 | 0.016 |
| Monomer Mixture B | MMA(g) | 77.6 | 77.6 | 77.6 | 77.6 | 77.6 | 77.6 | 77.6 | 77.6 |
| | 2-HEMA(g) | 2.4 | 2.4 | 2.4 | 2.4 | 2.4 | 2.4 | 2.4 | 2.4 |
| | MEHQ(g) | 0 | 0 | 0 | 0 | 0 | 0.024 | 0.24 | 0 |
| | SP Value (J/cm3)1/2 | 20.49 | 20.49 | 20.49 | 20.49 | 20.49 | 20.49 | 20.49 | 20.49 |
| Monomer Mixture Mass Ratio (A/B) | | 89/11 | 89/11 | 89/11 | 89/11 | 89/11 | 89/11 | 89/11 | 89/11 |
| Monomer Mixture A Dropping Time (min) | | 270 | 270 | 270 | 270 | 270 | 270 | 270 | 270 |
| Monomer Mixture B Dropping Time (min) | | 30 | 30 | 30 | 30 | 30 | 30 | 30 | 30 |
| Time t from Introduction of Polymerization Initiator to Polymerization Inhibitor (min) | | 390 | 390 | 390 | 390 | 390 | 390 | 390 | 390 |
| Method of Introducing Polymerization Inhibitor | | 5 Minutes before Dropping of Monomer Mixture B | 5 Minutes before Dropping of Monomer Mixture B | 5 Minutes before Dropping of Monomer Mixture B | 5 Minutes before Dropping of Monomer Mixture B | 5 Minutes before Dropping of Monomer Mixture B | At Same Time of Dropping of Monomer Mixture B | At Same Time of Dropping of Monomer Mixture B | 5 Minutes before Dropping of Monomer Mixture B |

TABLE 2-continued

| | | | | | | | | |
|---|---|---|---|---|---|---|---|---|
| Polymerization Inhibitor/Polymerization Initiator Molar Ratio (Q/I) | 1.8 | 26.5 | 0.4 | 0.9 | 17.7 | 1.8 | 17.7 | 0.9 |
| Evaluation Results — Adhesive Strength (MPa) | 1.4 | 1.3 | 1.4 | 1.2 | 1.3 | 1.4 | 1.3 | 1.3 |
| Tensile Strength (MPa) | 1.3 | 1.6 | 1.3 | 0.9 | 1.3 | 1.6 | 1.7 | 1.2 |
| Tensile Elongation (%) | 339 | 345 | 339 | 349 | 339 | 349 | 360 | 347 |
| Chipping Resistance (kg) | 21 | 26 | 27 | 20 | 27 | 29 | 32 | 23 |
| Viscosity Increasing Rate (%), 40° C., 5 days | 13 | 7 | 78 | 60 | 56 | 64 | 61 | 37 |
| Viscosity Increasing Rate (%), 40° C., 10 days | 52 | 214 | 173 | 29 | 74 | 147 | 101 | 89 |
| Acrylic Polymer Primary Particle Size (μm) | 0.6 | 0.6 | 0.6 | 0.6 | 0.6 | 0.6 | 0.6 | 0.6 |
| Secondary Particle Size after Spray Drying (μm) | 40 | 40 | 40 | 40 | 40 | 40 | 40 | 40 |

| | | Ex. 9 | Comp. Ex. 1 | Comp. Ex. 2 | Ex. 10 | Comp. Ex. 3 | Ex. 11 | Comp. Ex. 4 |
|---|---|---|---|---|---|---|---|---|
| Granular Multi-stage Polymer | | P-9 | C-1 | C-2 | P-10 | C-3 | P-11 | C-4 |
| Monomer Mixture A | MMA(g) | 336 | 336 | 336 | 336 | 336 | 296 | 216 |
| | t-BMA(g) | 318 | 318 | 318 | 0 | 0 | 0 | 0 |
| | i-BMA(g) | 0 | 0 | 0 | 318 | 318 | 280 | 205 |
| | 2-HEMA(g) | 17.5 | 17.5 | 17.5 | 17.5 | 17.5 | 15.4 | 11.2 |
| | SP value (J/cm3)1/2 | 19.80 | 19.80 | 19.80 | 19.95 | 19.95 | 19.95 | 19.95 |
| Polymerization Inhibitor | Kind of Polymerization Inhibitor | DPA | non | MEHQ | MEHQ | non | MEHQ | MEHQ |
| | Amount of Polymerization Inhibitor (g) | 0.033 | 0 | 0.48 | 0.024 | 0 | 0.024 | 0.035 |
| Monomer Mixture B | MMA(g) | 77.6 | 77.6 | 77.6 | 77.6 | 77.6 | 155.2 | 310.3 |
| | 2-HEMA(g) | 2.4 | 2.4 | 2.4 | 2.4 | 2.4 | 4.8 | 9.7 |
| | MEHQ(g) | 0 | 0 | 0 | 0 | 0 | 0 | 0 |
| | SP Value (J/cm3)1/2 | 20.49 | 20.49 | 20.49 | 20.49 | 20.49 | 20.49 | 20.49 |
| Monomer Mixture Mass Ratio (A/B) | | 89/11 | 89/11 | 89/11 | 89/11 | 89/11 | 79/21 | 57/43 |
| Monomer Mixture A Dropping Time (min) | | 270 | 270 | 270 | 270 | 270 | 240 | 180 |
| Monomer Mixture B Dropping Time (min) | | 30 | 30 | 30 | 30 | 30 | 60 | 120 |
| Time t from Introduction of Polymerization Initiator to Polymerization Inhibitor (min) | | 390 | — | 390 | 390 | — | 360 | 300 |
| Method of Introducing Polymerization Inhibitor | | 5 Minutes before Dropping of Monomer Mixture B | — | 5 Minutes before Dropping of Monomer Mixture B | 5 Minutes before Dropping of Monomer Mixture B | — | 5 Minutes before Dropping of Monomer Mixture B | 5 Minutes before Dropping of Monomer Mixture B |
| Polymerization Inhibitor/Polymerization Initiator Molar Ratio (Q/I) | | 1.8 | 0 | 35.3 | 1.8 | 0 | 1.4 | 1.4 |
| Evaluation Results | Adhesive Strength (MPa) | 1.1 | 1.1 | — | 1.3 | 1.5 | 1.1 | 1.1 |
| | Tensile Strength (MPa) | 1.4 | 1.4 | — | 1.2 | 1.2 | 1.0 | 1.3 |
| | Tensile Elongation (%) | 339 | 332 | — | 353 | 357 | 227 | 146 |
| | Chipping Resistance (kg) | 15 | 18 | — | 18 | 18 | 15 | 6 |
| | Viscosity Increasing Rate (%), 40° C., 5 days | 62 | 116 | unmeasurable solidified | 64 | 823 | 79 | 81 |
| | Viscosity Increasing Rate (%), 40° C., 10 days | 82 | 339 | | 581 | unmeasurable | 153 | 93 |
| Acrylic Polymer Primary Particle Size (μm) | | 0.6 | 0.6 | 0.6 | 0.6 | 0.6 | 0.6 | 0.6 |
| Secondary Particle Size after Spray Drying (μm) | | 40 | 40 | 40 | 40 | 40 | 40 | 40 |

Abbreviations in the table represent the following compounds.
MMA: methyl methacrylate (manufactured by Mitsubishi Rayon Co., Ltd.)
t-BMA: t-butyl methacrylate (manufactured by Mitsubishi Rayon Co., Ltd.)
i-BMA: i-butyl methacrylate (manufactured by Mitsubishi Rayon Co., Ltd.)
2-HEMA: 2-hydroxyethyl methacrylate (manufactured by Mitsubishi Rayon Co., Ltd.)
MEHQ: p-methoxyphenol (manufactured by Kanto Chemical Co., Inc.)
TBC: t-butylcatechol (manufactured by Tokyo Chemical Industry Co., Ltd.)
DPA: diphenylamine (manufactured by Nacalai tesque, Inc.)

As shown in Table 2, in Comparative Examples 1 and 3 of plastisol compositions using acrylic polymers produced without adding a polymerization inhibitor, storage stability was poor as shown in Table 2. In Comparative Example 2 of a plastisol composition using an acrylic polymer produced by excessively adding a polymerization inhibitor, the polymerization reaction of the monomer mixture (B) could not be controlled and storage stability was insufficient. In Comparative Example 4, the tensile elongation and the chipping resistant were poor because of small proportion of the monomer mixture (A).

The invention claimed is:

1. A method of producing an acrylic polymer comprising emulsion-polymerizing an acrylic monomer mixture (A) comprising methyl methacrylate and butyl methacrylate, wherein the total mass of the methyl methacrylate and the butyl methacrylate is 50% or more; and emulsion-polymerizing an acrylic monomer mixture (B) in the presence of a polymerization initiator and a polymerization inhibitor in amounts satisfying the following formula (1) in a polymer dispersion (D) obtained by the emulsion polymerization of the acrylic monomer mixture (A), $$0.1 \leq Q/I \leq 30 \tag{1}$$

wherein the mass ratio (A)/(B) of the acrylic monomer mixture (A) to the acrylic monomer mixture (B) is 70/30 to 95/5, and wherein Q in the formula (1) represents the molar amount of the polymerization inhibitor and I represents the molar amount of the polymerization initiator present in the polymer dispersion (D) at the time the polymerization inhibitor is introduced.

2. The method according to claim 1, wherein the solubility parameter (SA) of the polymer (A) obtained by polymerizing the acrylic monomer mixture (A) is smaller than the solubility parameter (SB) of the polymer (B) obtained by polymerizing the acrylic monomer mixture (B).

3. The method according to claim 1, wherein the mass ratio of the methyl methacrylate to the butyl methacrylate is in a range of 20/80 to 75/25.

4. An acrylic polymer obtained by the method according to claim 3.

5. A plastisol composition comprising the acrylic polymer according to claim 4 and a plasticizer.

* * * * *